US008818800B2

(12) United States Patent  
Fallat et al.

(10) Patent No.: US 8,818,800 B2  
(45) Date of Patent: Aug. 26, 2014

(54) OFF-AXIS AUDIO SUPPRESSIONS IN AN AUTOMOBILE CABIN

(75) Inventors: Mark Ryan Fallat, Vancouver (CA); Phillip Alan Hetherington, Port Moody (CA); Michael Andrew Percy, Vancouver (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 473 days.

(21) Appl. No.: 13/194,120

(22) Filed: Jul. 29, 2011

(65) Prior Publication Data

US 2013/0030801 A1 Jan. 31, 2013

(51) Int. Cl.  
*G10L 21/02* (2013.01)  
*H04B 15/00* (2006.01)

(52) U.S. Cl.  
USPC ............................ 704/226; 704/211; 381/94.1

(58) Field of Classification Search  
None  
See application file for complete search history.

(56) References Cited

U.S. PATENT DOCUMENTS

| | | | | |
|---|---|---|---|---|
| 4,333,170 | A * | 6/1982 | Mathews et al. | 367/125 |
| 5,325,436 | A * | 6/1994 | Soli et al. | 381/313 |
| 5,581,620 | A | 12/1996 | Brandstein et al. | |
| 7,436,188 | B2 * | 10/2008 | Taenzer | 324/613 |
| 7,577,266 | B2 | 8/2009 | Feng et al. | |
| 7,970,609 | B2 * | 6/2011 | Hayakawa | 704/238 |
| 8,300,846 | B2 * | 10/2012 | Kim et al. | 381/94.3 |
| 8,406,432 | B2 * | 3/2013 | Kim et al. | 381/107 |
| 2006/0153360 | A1 | 7/2006 | Kellermann et al. | |
| 2006/0215849 | A1 | 9/2006 | Smaragdis et al. | |
| 2007/0030982 | A1 * | 2/2007 | Jones et al. | 381/94.1 |
| 2007/0160230 | A1 * | 7/2007 | Nakagomi | 381/97 |
| 2007/0172079 | A1 | 7/2007 | Christoph | |
| 2007/0274536 | A1 | 11/2007 | Matsuo | |
| 2008/0120100 | A1 * | 5/2008 | Takeda et al. | 704/233 |
| 2008/0181058 | A1 * | 7/2008 | Hayakawa | 367/125 |
| 2010/0014690 | A1 | 1/2010 | Wolff et al. | |
| 2010/0110834 | A1 | 5/2010 | Kim et al. | |
| 2010/0208902 | A1 * | 8/2010 | Yoshizawa et al. | 381/56 |
| 2011/0019835 | A1 | 1/2011 | Schmidt et al. | |
| 2011/0158426 | A1 | 6/2011 | Matsuo | |
| 2012/0148067 | A1 * | 6/2012 | Petersen et al. | 381/92 |

FOREIGN PATENT DOCUMENTS

| | | |
|---|---|---|
| EP | 1538867 A1 | 6/2005 |
| EP | 1701587 A2 | 9/2006 |
| EP | 1887831 A2 | 2/2008 |
| EP | 1918910 A1 | 5/2008 |
| EP | 1695873 B1 | 7/2008 |

(Continued)

OTHER PUBLICATIONS

Piersol, Allan. "Time delay estimation using phase data." Acoustics, Speech and Signal Processing, IEEE Transactions on 29.3 (1981): 471-477.*

(Continued)

*Primary Examiner* — Brian Albertalli  
(74) *Attorney, Agent, or Firm* — Gowling Lafleur Henderson LLP (57) ABSTRACT

The suppression of off-axis audio in an audio environment is provided. Off-axis audio may be considered audio that does not originate from a region of interest. The off-axis audio is suppressed by comparing a phase difference between signals from two microphones to a target slope of the phase difference between signals originating from the region of interest. The target slope can be adapted to allow the region of interest to move with the location of a human speaker such as a driver.

21 Claims, 8 Drawing Sheets

(56) References Cited

FOREIGN PATENT DOCUMENTS

| EP | 1633121 | B1 | 11/2008 |
| EP | 2063419 | A1 | 5/2009 |
| EP | 2045140 | B1 | 1/2010 |
| EP | 2197219 | A1 | 6/2010 |
| EP | 2222091 | A1 | 8/2010 |
| EP | 2081189 | B1 | 9/2010 |
| EP | 1901282 | B1 | 11/2010 |
| WO | 2009062211 | A1 | 5/2009 |
| WO | 2009065542 | A1 | 5/2009 |

OTHER PUBLICATIONS

Li, Danfeng, and Stephen E. Levinson. "A linear phase unwrapping method for binaural sound source localization on a robot." Robotics and Automation, 2002. Proceedings. ICRA'02. IEEE International Conference on. vol. 1. IEEE, 2002.*

Brandstein, Michael S., John E. Adcock, and Harvey F. Silverman. "A practical time-delay estimator for localizing speech sources with a microphone array." Computer Speech & Language 9.2 (1995): 153-169.*

Shimoyama, Ryuichi, and Ken Yamazaki. "Acoustic source localization using phase difference spectrum images." Acoustical Science and Technology 24.4 (2003): 161-171.*

QNX—QNX Aviage Acoustic Processing Alpha 2.0, 2011, pp. 10, 69-77.

Transcon—Digital Array Microphone, 2010.

Hamid Al-Nashi: "Phase Unwrapping of digital Signals" Nov. 1, 1989.

European Search Report from corresponding EP application 11175926.2 Dated Dec. 27, 2011.

* cited by examiner

Figure 8

OFF-AXIS AUDIO SUPPRESSIONS IN AN AUTOMOBILE CABIN

TECHNICAL FIELD

The current application relates to processing of audio in an audio environment, and in particular to the suppression of audio that is off-axis from a desired direction.

BACKGROUND

Automobiles increasingly incorporate electronic devices into the cabin. These electronic devices may include for example mobile devices, navigation systems, control systems, and/or audio/video systems. It is desirable to allow interaction with these devices using voice commands in order to allow a driver to focus on driving the automobile.

In order to allow interaction and control of electronics using voice commands using audio from an audio environment such as an automobile cabin, it is necessary to process audio signals in order to identify desired voice commands. Voice recognition is used to translate received audio into a voice command, which can then be executed to interact with or control the electronics of the automobile or devices connected thereto. However, in an automobile environment it can be difficult to isolate audio associated with a human speaker from other noise present in the cabin or external to the cabin. Additional audio that may make voice recognition difficult may include, for example, conversations from other occupants, road noise, wind noise, windshield washer noises, turn signals, etc.

Attempts to enhance audio corresponding to a specific occupant and suppress audio associated with noise have been limited in success. Some attempts use a fixed array of microphones to determine the location of an audio signal. In particular, these attempted solutions have used a phase difference between signals of individual microphones of the microphone array. Often these solutions require that the microphones in the microphone array be positioned in a specific location, with a predetermined separation between microphones. This places an undesirable restriction on automobile manufacturers when designing an automobiles interior cabin.

It would be desirable to be able to suppress off-axis audio in an audio environment while allowing flexibility in the position of microphones.

BRIEF DESCRIPTION OF THE DRAWINGS

Embodiments are described herein with references to the appended drawings, in which.

DETAILED DESCRIPTION

In accordance with the present disclosure there is provided a method of off-axis audio suppression in an audio environment comprising receiving first and second audio signals from first and second microphones positioned within the automobile cabin; calculating a phase difference between the first and second audio signals; calculating a direction error between the calculated phase difference and a target slope, the target slope defining a desired phase difference between signals from the first and second microphones corresponding to audio originating from a region of interest; and processing the first and second audio signals based on the calculated direction error to suppress off-axis audio relative to the positions of the first and second microphones and the region of interest.

In accordance with the present disclosure there is further provided an apparatus performing off-axis audio suppression in an audio environment comprising a processor and memory configuring the apparatus to provide a target slope stored in memory defining a desired phase difference between signals from first and second microphones corresponding to audio originating from a region of interest; a source-locating component calculating a direction error between the target slope and a phase difference between first and second audio signals received from the first and second microphones; and an audio mixer processing the first and second audio signals based on the calculated direction error to suppress off-axis audio relative to the positions of the first and second microphones and the region of interest.

In accordance with the present disclosure there is further provided a computer readable memory containing instructions which when executed by a processor perform a method of off-axis audio suppression in an audio environment comprising receiving first and second audio signals from first and second microphones positioned within the automobile cabin; calculating a phase difference between the first and second audio signals; calculating a direction error between the calculated phase difference and a target slope, the target slope defining a desired phase difference between signals from the first and second microphones corresponding to audio originating from a region of interest; and processing the first and second audio signals based on the calculated direction error to suppress off-axis audio relative to the positions of the first and second microphones and the region of interest.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Off-axis audio suppression is described in detail with regards to FIGS. 1-8. The off-axis audio suppression is described as being applied in an automobile cabin to improve the audio signal used to perform voice recognition to identify commands provided by the driver of the automobile. As described later, it is also contemplated that the off-axis audio suppression may also be used to improve the audio quality of hands-free phone conversations, as well as improve the audio signal from automobile occupants other than the driver. Further, although described with regards to an automobile cabin, it is contemplated that the off-axis audio suppression may be used in other audio environments.

Figure 1:
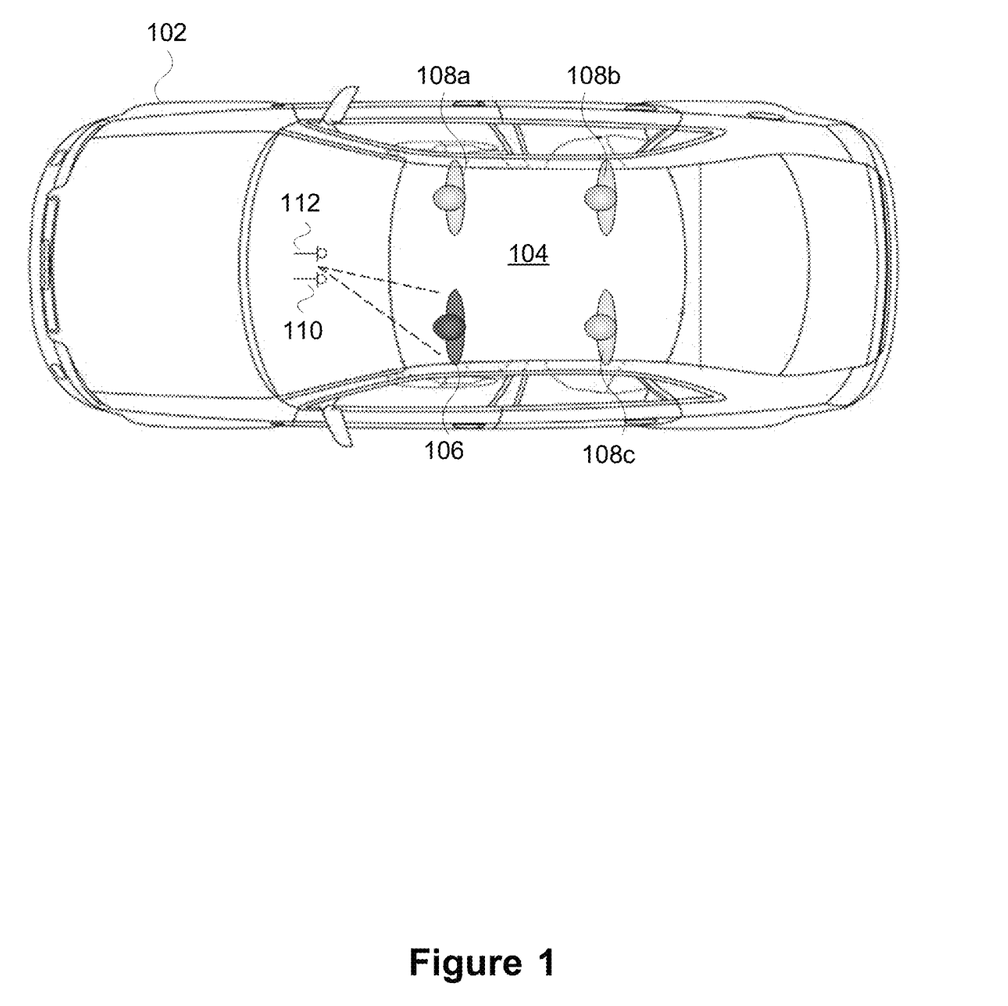
FIG. 1 depicts in a diagram an illustrative environment in which off-axis audio suppression may be used.

FIG. 1 depicts in a diagram an illustrative environment in which off-axis audio suppression may be used. As depicted, an automobile 102 includes a cabin 104 in which a driver 106 and passengers 108a, 108b, 108c (referred to collectively as passengers 108) sit. It will be appreciated that the passengers do not need to be present in the cabin 104. A plurality of microphones 110, 112 are positioned within cabin to pick up sound within the cabin 104. Although two microphones are described herein, it is contemplated that more microphones could be positioned within the cabin 104.

Voice recognition is typically activated by the driver pressing a button, for example on the steering wheel, although other arrangements are possible. Once the voice recognition is activated, audio signals captured from the microphones 110, 112 are processed to identify an associated command. For example, commands may include "Call home", "Play album", "Get directions", etc. Once the captured audio is processed and the associated command identified, it can be executed by an appropriate system or component of the automobile.

In the environment of FIG. 1, the voice recognition processing may be impeded by additional audio other than the driver's spoken command. For example, conversations between the passengers may make identifying a desired command associated with the driver's spoken command difficult. In order to enhance audio associated with the driver's spoken command and suppress the additional audio, conceptually a region of interest is associated with the driver 106 and an axis determined from the region of interest to the microphones 110, 112. The axis may be represented by a slope of a phase difference between audio received at two spaced apart microphones. Audio that is determined to originate from a source off-axis to the region of interest is suppressed. By suppressing the off-axis audio, an improved audio signal can be provided to the voice recognition system, improving the chances of correctly identifying a spoken command.

In order to suppress off-axis audio, a phase difference between the audio signals captured by the two microphones is compared to a target slope. The audio signals from each microphone are converted into a frequency domain representation that includes phase information associated with discrete frequency ranges or bins. The phase difference between the two signals is determined as the difference between the phase information for each corresponding frequency range or bin of the frequency domain audio signals. The target slope defines a desired phase difference between signals from the first and second microphones corresponding to audio originating from the region of interest. The phase difference between two signals may be described by a slope since the expected phase difference for an audio signal will not necessarily be constant across all frequencies, but will be a slope linearly increasing or decreasing from 0 at 0 Hz. The actual phase difference is compared to the desired phase difference corresponding to audio originating from the region of interest. The region of interest defined by the target slope is adaptively updated in order to correspond to an actual location of the driver giving the spoke command. Adaptively adjusting the region of interest defined by the slope allows the driver to move freely while still maintaining suppression of additional audio not associated with the driver's spoken command.

The target slope is determined as the phase difference versus frequency of audio that comes from the region of interest. When each audio signal is converted to a frequency domain signal, an interval of audio, for example 32 milliseconds (ms) may be converted to a frame of audio in the frequency domain. The frame of audio comprises information regarding the amplitude and phase of the audio for different frequencies. The frequencies may be grouped together in discrete ranges or bins and the amplitude and phase for each bin determined.

Figure 2:
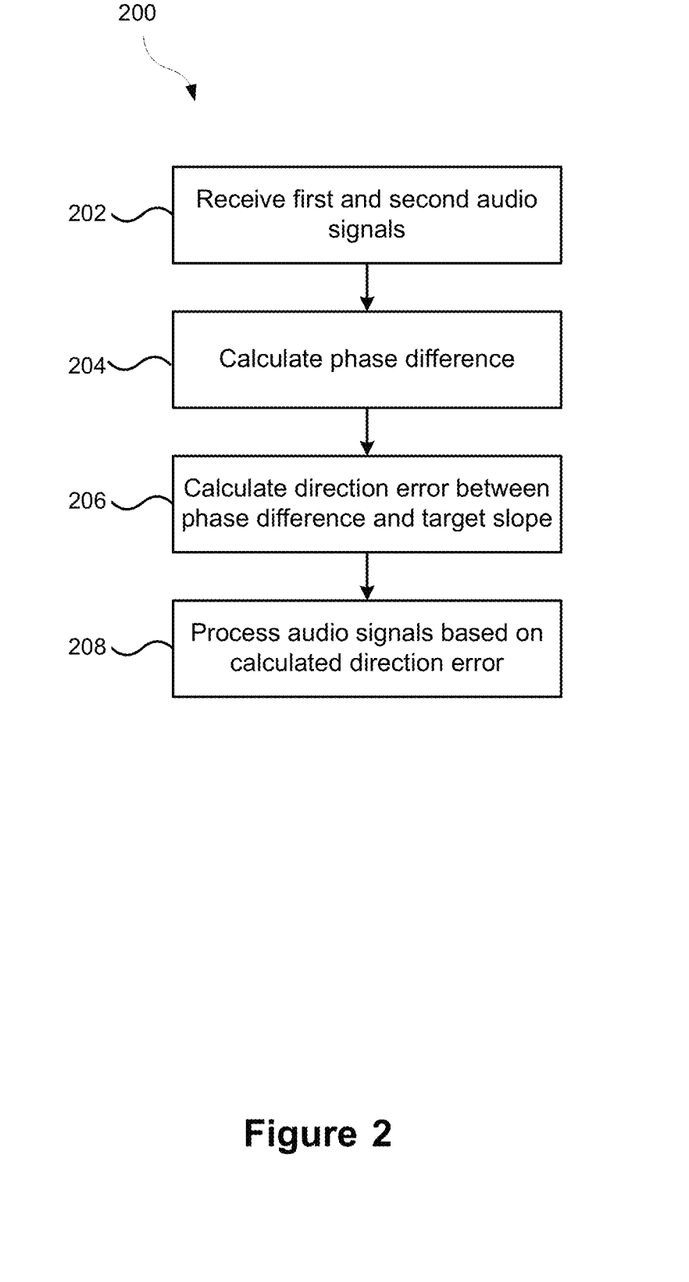
FIG. 2 depicts in a flow diagram an illustrative method of off-axis audio suppression.

FIG. 2 depicts in a flow diagram an illustrative method of off-axis audio suppression. The method 200 begins with receiving first and second audio signals (202), which correspond to the audio captured from the first and second microphones. The audio signals are processed and a phase difference between the two signals is calculated (204). The phase difference is calculated for each frequency range or bin of the frequency domain audio signals. Once the phase difference between the two signals is calculated, a direction error is calculated between the phase difference and a target slope (206). As described above, the target slope defines a desired phase difference between signals from the microphones corresponding to audio from the region of interest. As such, the direction error provides an indication as to whether the audio signals correspond to audio from the region of interest. The calculated phase difference is used to process the audio signals (208) and suppress off-axis audio. The processed audio may be used for voice recognition and may provide better results due to the suppressed off-axis audio.

Figure 3:
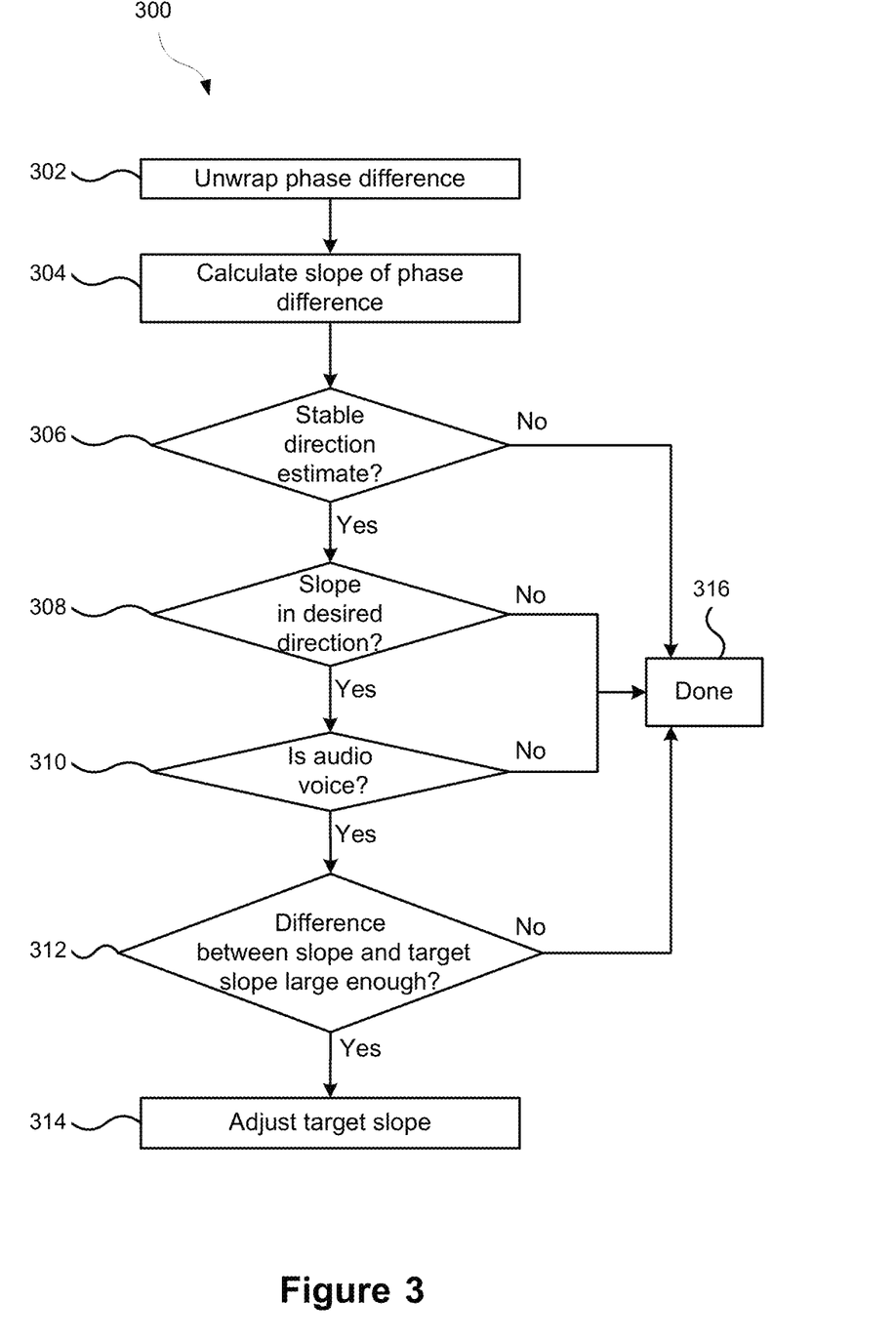
FIG. 3 depicts in a flow diagram an illustrative method of adapting a target slope.

FIG. 3 depicts in a flow diagram an illustrative method 300 of adjusting a target slope used in suppressing off-axis audio. As described above, the target slope defines a region of interest corresponding to a location in the automobile cabin that the desired audio for the voice recognition originates from. The target slope is adjusted based on the audio received from the microphones in order to adapt the region of interest to correspond to the location of he audio source as it moves within the automobile cabin. To adjust the target slope, the phase difference is unwrapped (302). The audio signals captured from the microphones are transformed into a frequency domain representation and the phase difference calculated. However in doing so the phase difference is limited to between +/−pi, regardless of if the actual phase difference is larger. The unwrapping of the phase difference returns the limited phase difference signal to the actual representation of the phase difference. Once the phase difference is unwrapped, the slope of the unwrapped phase difference is calculated (304). Checks are then made to determine if the slope of the phase difference should be used to update the target slope. These checks include determining if the slope of the phase difference provides a stable estimate of the direction of the audio (306). The direction may be stable if, for example the slope of the phase difference has not changed greatly within a time interval, for example 2 or more frames of the frequency domain signal. If the direction is not stable (No at 306), the phase difference should not be used to update the target slope and the method is done (316). If the direction is stable (Yes at 306) it is determined if the slope is in the desired direction (308). The slope will typically be either increasing or decreasing depending on where, relative to the microphones the audio originates from. During an initial configuration of the method one of the microphones may be indicated as being closer to the driver, or other desired occupant. In such a case, the desired direction of the slope of the phase difference would be increasing, since higher frequencies will have a larger phase difference than lower frequencies. As will be appreciated, the desired direction may change if, for example, it is desired to enhance audio coming from the passenger side of the automobile cabin rather than the driver. If the slope of the phase difference is in the wrong direction (No at 308) than the audio is not coming from the desired side of the automobile cabin and so the slope of the phase difference should not be used to update the target slope and so the method is done (316). When the slope of the phase difference is in the right direction (Yes at 308), then the audio is coming from the desired side of the automobile cabin and it is determined if the audio is considered voice audio (310). As will be appreciated there are various ways to determine if the audio is associated with voice. Voice audio is typically associated with higher energy. If the audio is not voice audio (No at 310) then the audio is considered noise and so should not be used to update the target slope. When the audio is voice (Yes at 310) it is determined if the difference between the slope of the phase difference and the current target slope is large enough to use for adapting the target slope (312). A defined tolerance or threshold value may be used in determining if the difference is large enough. When the difference is not large enough (No at 312) the method is done (316). When the difference is large enough (Yes at 312) then the slope of the phase difference is used to adjust the target slope (314). The target slope may be adjusted using a weighted means such as, for example, a leaky integrator.

As described above, the target slope is adjusted based on the slope of the phase difference of the signals. The difference between the slope of the phase difference and the current target slope is used in adjusting the target slope. However, if the audio enhancement has just been initiated, for example, by the driver pressing a button on the steering wheel, the target slope may not have been set yet and so the difference between the target slope and the slope of the phase difference cannot be determined. In such a case, rather than determining if the difference between the slope of the phase difference and the target slope is sufficient, the target slope may be set to the slope of the phase difference as an initial value.

Figure 4:
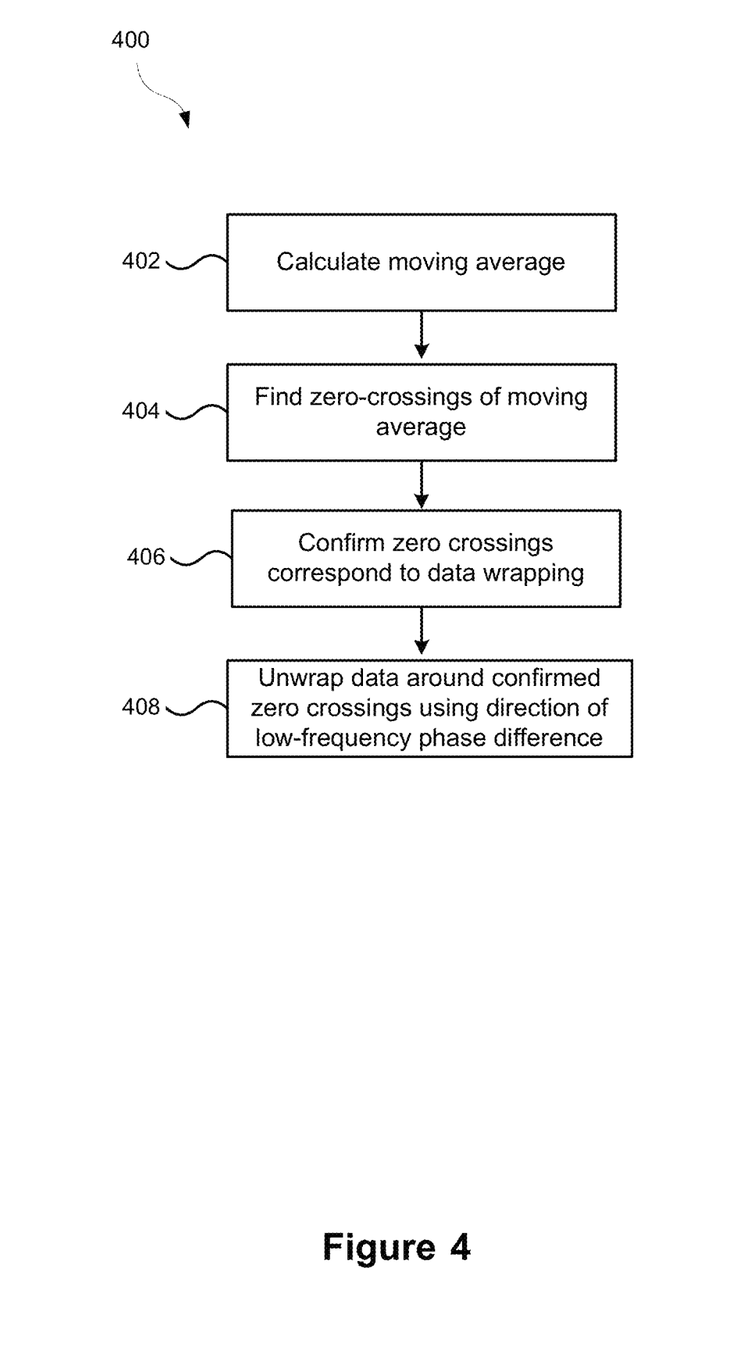
FIG. 4 depicts in a flow diagram an illustrative method of unwrapping a phase difference.

FIG. 4 depicts in a flow diagram an illustrative method of unwrapping a phase difference. As described above, in calculating the phase difference between the frequency domain audio signals the phase difference is limited to be between +/−pi. As a result, when the slope crosses +/−pi, it wraps around to −/+pi resulting in a discontinuous slope. In order to unwrap the phase difference according to the method 400, a moving average of the phase difference is calculated (402) and zero crossings of the average are located (404). The moving average is used to detect a flip in the sign of the phase difference, which corresponds to potential phase wrapping. The zero-crossings may represent locations where the phase difference has been wrapped or they may represent an actual phase difference of 0. As such, the zero crossings are confirmed to correspond to data wrapping (406). To confirm the zero-crossing does corresponds with data wrapping, the directions of the moving average before and after the flip or zero crossing are compared to check that the slopes are moving in the correct direction. That is, the moving average was rising before wrapping to −pi or falling before wrapping to +pi. The zero crossings are also checked to ensure that there was a minimum frequency difference between adjacent zero crossing points. Once the zero-crossings are confirmed, the phase difference data is unwrapped around the confirmed zero crossings by either adding or subtracting 2*pi to all of subsequent phase difference values (408). Whether to add or subtract 2*pi is determined based on the low-frequency phase difference. If the low-frequency phase difference is decreasing then 2*pi is subtracted and if the low-frequency phase difference is increasing, 2*pi is added.

Figure 5:
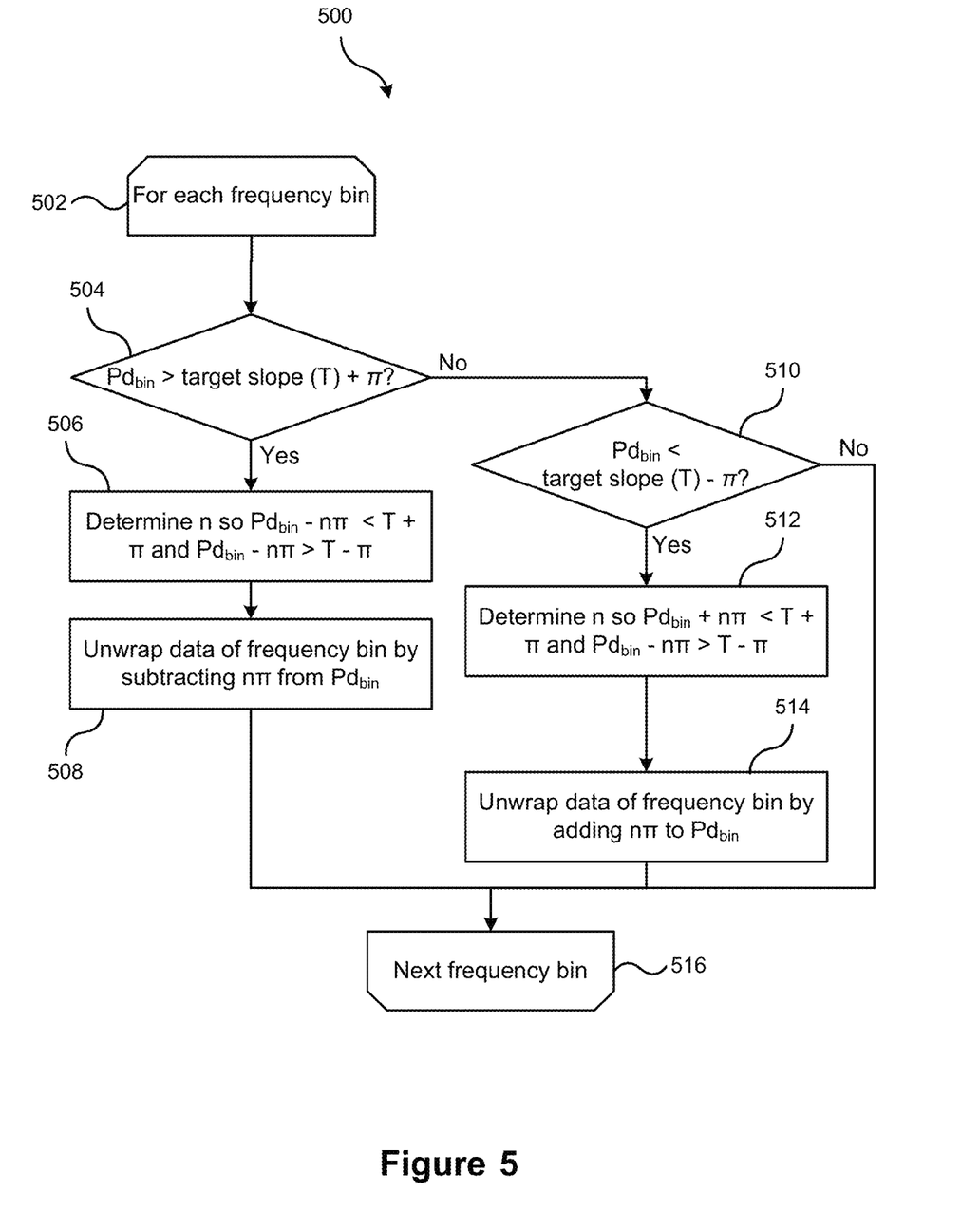
FIG. 5 depicts in a flow diagram a further illustrative method of adapting a target slope.

FIG. 5 depicts in a flow diagram a further illustrative method of unwrapping the phase difference. As described above, the frequency domain signals are segmented into frequency ranges or bins. Rather than unwrapping the data based on a moving average as described above, the method 500 unwraps the phase difference of each frequency bin individually based on the target slope. For each frequency bin of the phase difference (502) the method determines if the phase difference associated with the respective frequency bin (indicated as $Pd_{bin}$ in the Figure for brevity) is larger than the target slope value at the frequency of the bin (indicated as T in the Figure for brevity) plus pi (504). If the phase difference is larger than the slope value plus pi (Yes at 504) a value, n, is determined such that the phase difference minus n*pi is within +/−pi of the target slope value (506). The unwrapped value for the frequency bin is the set as the wrapped value minus n*pi (508).

If the phase difference is not greater than the target slope plus pi, it is determined if the phase difference is less than the target slope minus pi (510). If it is (Yes at 510) a value, n, is determined such that the phase difference plus n*pi is within +/−pi of the target slope value (512), and the phase difference of the frequency bin is set to the phase difference plus n*pi (514). If the phase difference is not less than the target slope minus pi (No at 510), than the phase difference for the frequency bin is between +/−pi of the target slope and does not need to be unwrapped. Once the frequency bin has been unwrapped, the next frequency bin is processed (516). The unwrapped phase difference may then be used in adjusting the target slope, for example, as described above with regards to FIG. 3.

When the phase difference is unwrapped it is possible to determine a slope confidence value indicating a confidence in the unwrapped phase difference. The slope confidence may be determined by a signal to noise ratio for each frequency bin in the unwrapped phase difference and summing the individual ratios together to provide a slope confidence. The slope confidence may then be used when adapting the target slope. For example, if the slope confidence value is below a threshold, the target slope may not be updated as the signal is too noisy. If the slope confidence is above the threshold it may be further used as a weighting factor of the leaky integrator used to adjust the target slope.

Figure 6:
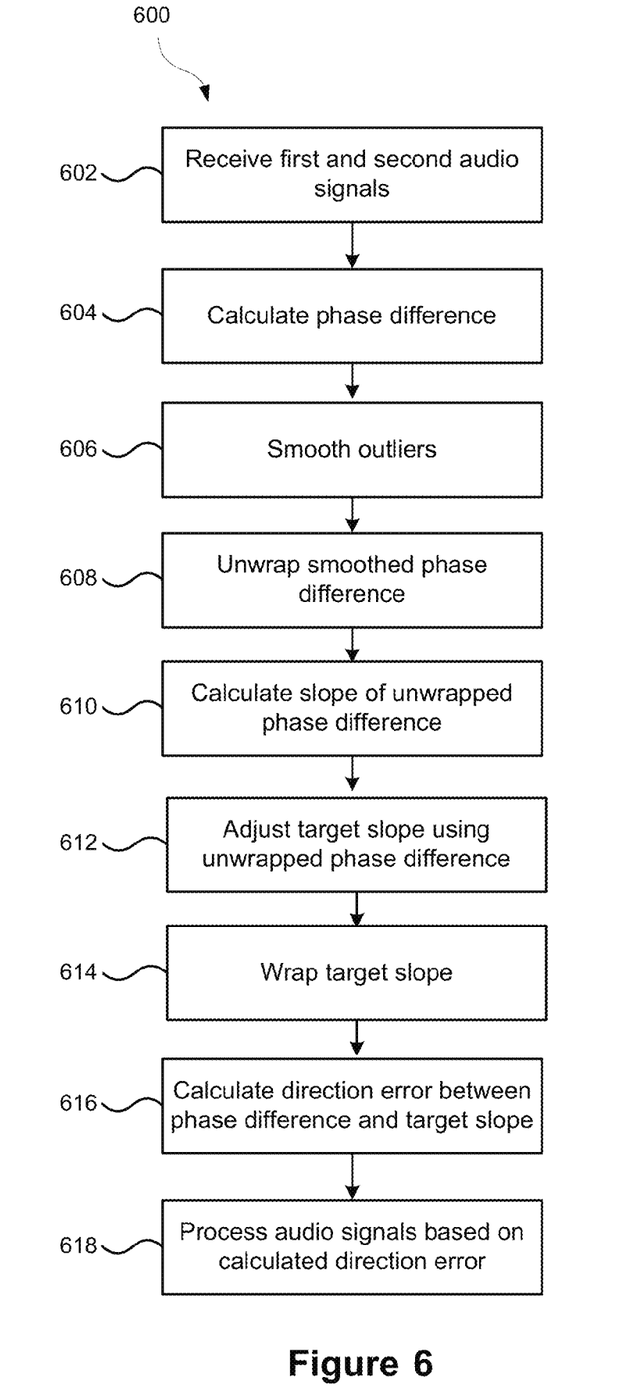
FIG. 6 depicts in a flow diagram a further illustrative method of off-axis audio suppression.

FIG. 6 depicts in a flow diagram a further illustrative method of off-axis audio suppression. The method 600 is similar to the method 200 of FIG. 2, however the method includes adjusting the target slope to adapt the region of interest prior to calculating the direction error. The method receives first and second audio signals from the microphones (602). The audio signals may be frequency domain representations of a frame of audio. For example, the audio signals may comprise a frequency domain representation of 32 ms of audio. The phase difference between the two audio signals is determined (604). Each audio signal may comprise a plurality of frequency bins each with an associated phase. The phase difference may be calculated as the difference between the corresponding frequency bins. Once the phase difference is determined outliers of the phase difference are determined and the phase difference smoothed (606). The smoothed phase difference is unwrapped (608) and the slope of the smoothed phase difference is calculated (610). The slope of the unwrapped phase difference is used to adjust the target slope (612) and then the target slope is re-wrapped (614). By re-wrapping the target slope it is possible to compare the target slope to the phase difference of audio signals without needing to unwrap the phase difference of the audio signals. Once the target slope is adjusted and re-wrapped, a direction error is calculated between the adjusted target slope and the phase difference between the received audio signals (616) and the audio signals processed based on the calculated direction error (618).

Figure 7:
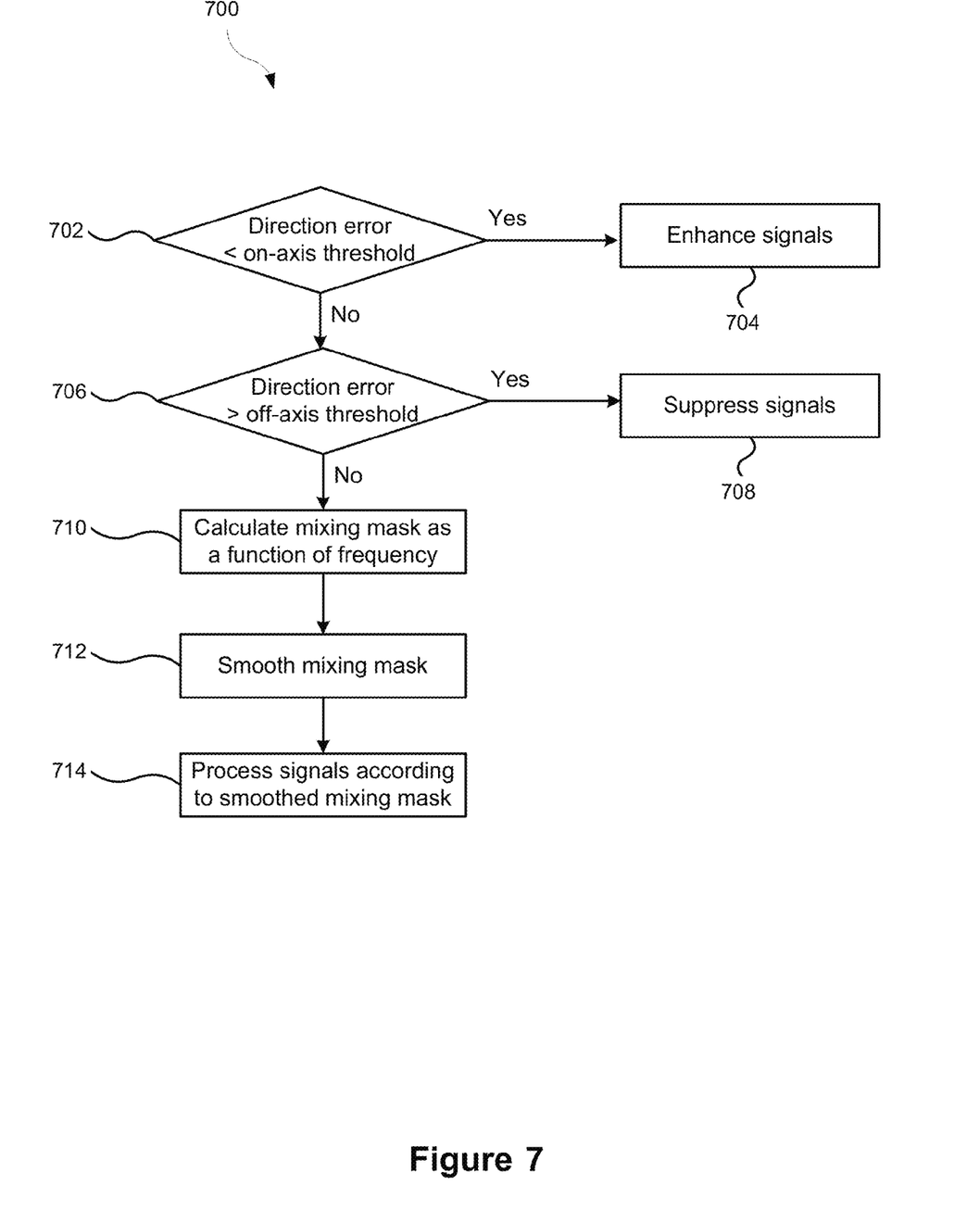
FIG. 7 depicts in a flow diagram an illustrative method of processing audio.

FIG. 7 depicts in a flow diagram an illustrative method 700 of processing audio based on the calculated direction error. The direction error is checked to see if it is less than an on-axis threshold (702). If it is (Yes at 702), the audio corresponds to voice audio originating from the region of interest and so the audio signals are mixed together to enhance the audio (704). If the direction error is not less than the on-axis threshold (No at 702), the direction error is checked to determine if it is greater than an off-axis threshold (706). If the direction error is greater than the off-axis threshold (Yes at 706) the audio signals correspond to noise audio or voice audio originating from out of the region of interest and so the audio signals are mixed together to suppress the audio (708). If the direction error is not less than the on-axis threshold and is not greater than the off-axis threshold (No at 706), then the audio is a combination of voice audio and noise audio. A mixing mask is calculated as a function of frequency (710). The mixing mask may comprise a weighting for each frequency of the signals to use during the mixing of the audio signals in order to suppress noise and enhance the voice audio originating from within the region of interest. The weighting of each frequency may be based on the direction error for the particular frequency. The mixing mask is smoothed (712) and the audio signals processed according to the smoothed mixing mask (714).

Once the audio is processed as described above, the processed audio may be provided as input to a voice recognition component. By processing the audio as described above, audio corresponding to voice audio originating from the region of interest, such as from the driver, can be enhanced while other audio is suppressed. The processing can provide an improved audio signal for the voice recognition providing improved voice recognition.

Figure 8:
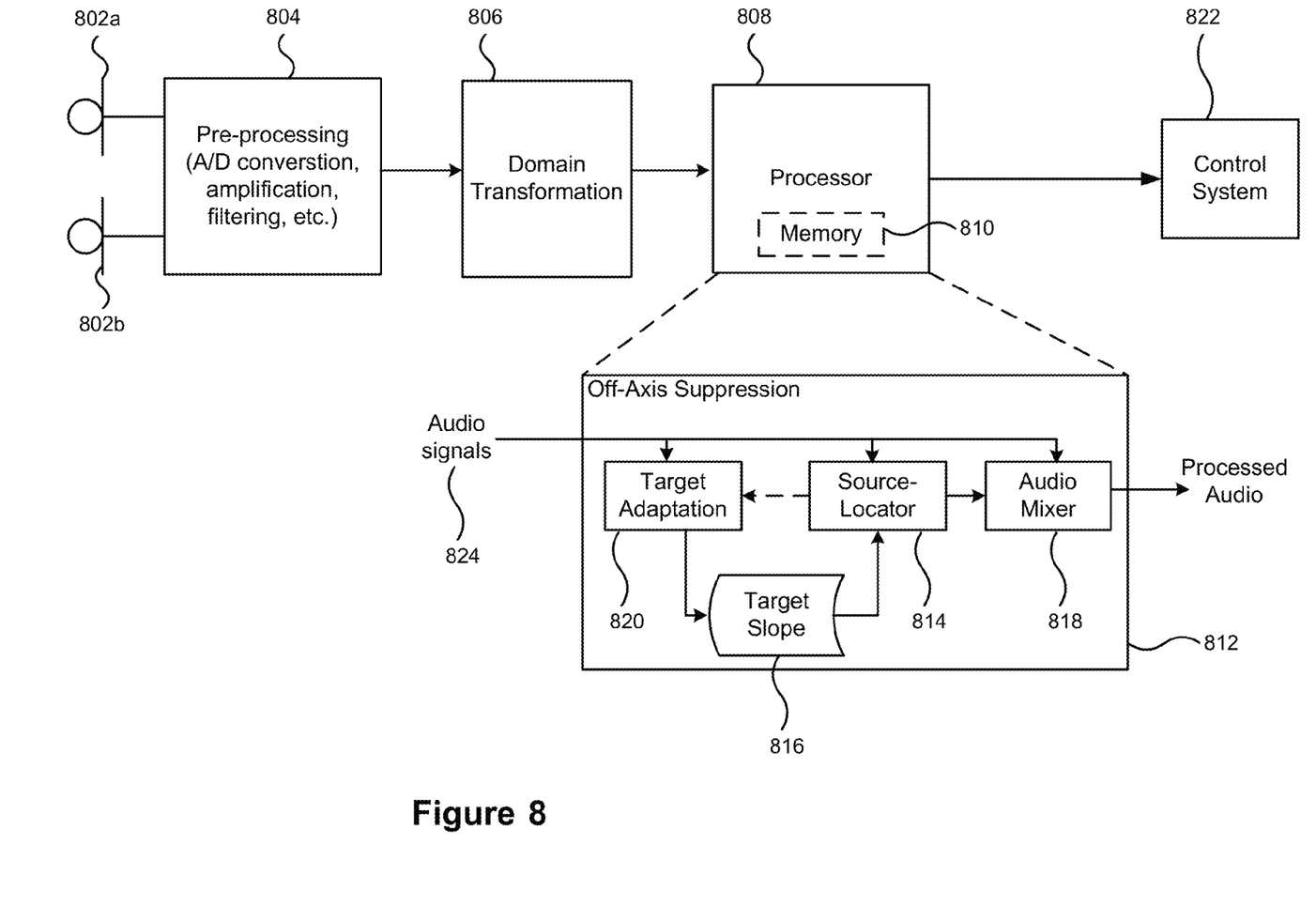
FIG. 8 depicts in a block diagram illustrative components of a system for suppressing off-axis audio.

FIG. 8 depicts in a block diagram illustrative components of a system for suppressing off-axis audio. The system 800 comprises two or more microphones 802a, 802b (referred to collectively as microphones 802) that capture sound from within an automobile cabin. The off-axis suppression described above does not require the microphones 802 to be placed in a specific location within the automobile cabin. Further the position of the microphones 802 does not need to be predetermined. As such, the individual microphones 802a, 802b can be located within the automobile cabin individually, allowing greater freedom in selecting the microphones to use as well as their location. The microphones 802 are typically placed towards the front of the automobile cabin. The microphones provide a signal corresponding to the captured audio to a pre-processing component 804. The pre-processing component 804 may perform various processes on the signals from the microphones 802, including analog to digital conversion, amplification and filtering. The pre-processing component 804 provides digital signals corresponding to the microphone signals to a domain transformation component 806 which converts the digital signals in to corresponding frequency domain representation. The domain transformation component 806 may use, for example, a Fast Fourier Transform to transform a time interval of the digital signals to corresponding frequency domain signals. The frequency domain signals may be segregated into discrete frequency ranges or bins. The domain transformation component 806 may also determine the phase associated with each of the frequency bins of the digital signals. The frequency domain signals may be provided to a processor 808 that processes the frequency domain audio signals to suppress off-axis audio.

The processor 808 may include memory 810 for storing data and/or instructions used in the processing of the audio signals.

The processor 808 provides an off-axis suppression component 812 for processing the audio signals 824. The off-axis suppression component 812 may be provided in the hardware of the processor 808, or may be provided as a result of the hardware of the processor 808 executing instructions stored in the memory 810 or in a memory external to the processor 808. The off-axis suppression component 812 comprises a source-locator component 814 that receives the frequency domain audio signals, and compares a slope of the phase difference between the audio signals to a target slope 816 in order to determine a direction error as described above, for example with respect to FIG. 2. The direction error may then be used by an audio mixer component 818 that mixes the audio signals to produce a processed audio signal that has off-axis audio suppressed.

The off-axis suppression component 812 also comprises a target adaptation component 820. The target adaptation component 820 adapts the target slope based on the received audio signals as described above, for example with respect to FIG. 3. The target adaptation component 820 adapts the target slope if the phase difference between the audio signals, which may be provided by the source locator component 814, has a slope in the desired direction and the audio signals correspond to voice. The target adaptation component 820 allows a speaker, such as the driver to move within the automobile cabin while still providing off-axis audio suppression. The processed audio of the off-axis suppression component 812 is provided to a control system 822 that utilizes the processed audio. As will be appreciated, the control system 822 may utilize the processed audio in various ways. For example, the control system 822 may be a voice recognition system that attempts to determine a command from the processed audio to control an automobile system or component, such as an audio system, a navigation system, or other automobile options. Additionally or alternatively, the control system 822 may be associated with hands-free phone system in which the processed audio may be transmitted to another participant of a phone call, where the processed audio reduces the background noise from the automobile cabin.

The various components of the system 800, such as the pre-processing component 804, the domain transformation component 806, and the processor 808 have been depicted as separate components. It is contemplated that the functionality provided by each component may be incorporated into more or fewer components. For example, the domain transformation component 806 and the processor 808 may be provided by a single component. Additionally, all of the components including the pre-processing component 804 and the control system 822 may be provided by a single component or apparatus.

The processing of audio to suppress off-axis audio has been described above with regards to improving voice audio from a driver to improve voice recognition. It is possible to process the audio from other passengers. For example, by changing the direction used when setting the target slope, it is possible to enhance audio from the passenger. Additionally or alternatively, it is possible to process the audio to improve a hands-free call in order to suppress noise or conversations from other occupants in the automobile.

It will be appreciated that the off-axis audio suppression described herein allows audio from a desired location to be identified. Although specific embodiments have been described with regards to how the audio is processed based on whether the audio was considered to be from a desired location, namely the region of interest, other processing of the captured audio, based on whether the audio is determined to be from a desired location or not, is possible.

Further, the above has described the off-axis audio suppression with regards to an automobile cabin application. The off-axis audio suppression described herein may be applied to other environments in which audio is captured by a plurality of microphones positioned in the environment. For example, the off-axis audio suppression could be used in rooms to improve voice recognition or remove background audio. It will be appreciated that setting an initial target slope in audio environments, such as a room, where a speaker may be located in numerous different locations, may require further processing. The target slope could be initiated based on a location that a first sound is received from. Such an implementation would 'focus in' on a first speaker or sound location once the off-axis audio suppression was initiated. Additionally or alternatively, the target slope could be initiated using one or more additional components, such as an image captured device, or other presence sensor, to identify a location of a desired human speaker and then calculate or estimate a slope of audio received from the identified location.

What is claimed is:

1. A method of off-axis audio suppression in an audio environment comprising:
   receiving first and second audio signals from first and second microphones positioned within the audio environment;
   calculating a phase difference between the first and second audio signals;
   adjusting a target slope based on the calculated phase difference between the first and second audio signals to adapt the region of interest based on a location of a human speaker within the audio environment, the target slope defining a desired phase difference between signals from the first and second microphones corresponding to audio originating from a region of interest, and where adjusting the target slope includes:
      unwrapping the calculated phase difference;
      calculating a slope of the unwrapped phase difference;
      calculating a difference between the slope and the target slope;
      determining if the calculated difference is larger than a defined tolerance;
      adjusting the target slope based on the slope of the unwrapped phase difference;
   calculating a direction error between the calculated phase difference and the target slope; and
   processing the first and second audio signals based on the calculated direction error to suppress off-axis audio relative to the positions of the first and second microphones and the region of interest.

2. The method of claim 1, further comprising:
   calculating a slope confidence value when unwrapping the calculated phase difference, the slope confidence value determined as a sum of a signal-to-noise ratio of each of a plurality of frequency ranges of the calculated phase difference; and
   adjusting the target slope based on the slope of the unwrapped phase difference and the slope confidence value.

3. The method of claim 1, further comprising:
   smoothing the calculated slope;
   determining if an initial value for the target slope has been set;
   determining if the smoothed slope has been stable for a time interval;
   determining if the smoothed slope is in a desired direction based on the sign of the smoothed slope and the location of the human speaker in the audio environment;
   determining if the first and second audio signals correspond to voice audio; and
   setting an initial value for the target slope based to the smoothed slope when the initial value has not been set, the smoothed slope has been stable for the time interval, the smoothed slope is in the desired direction and the first and second audio signals correspond to voice audio.

4. The method of claim 1, further comprising:
   smoothing the calculated slope;
   determining if the smoothed slope has been stable for a time interval;
   determining if the smoothed slope is in a desired direction based on the sign of the smoothed slope and the location of the human speaker in the audio environment;
   determining if the first and second audio signals correspond to voice audio;
   adjusting the target slope based on the slope of the unwrapped phase difference using a leaky integrator when the smoothed slope has been stable for the time interval, the smoothed slope is in the desired direction and the first and second audio signals correspond to voice audio; and
   keeping the target slope unchanged when the smoothed slope has been stable for the time interval or the smoothed slope is not in the desired direction or the first and second audio signals do not correspond to voice audio.

5. The method of claim 1, wherein unwrapping comprises:
   calculating a moving average of the phase difference;
   locating zero-crossings of the moving average;
   confirming the zero crossing actually represent direction changes; and
   unwrapping the phase difference based on the located confirmed zero-crossings and the direction of a low-frequency phase difference.

6. The method of claim 1, wherein unwrapping comprises:
   determining if a difference between the phase difference and the target slope is greater than pi or less than −pi;
   subtracting n*pi from the phase difference when the difference between the phase difference and the target slope is greater than pi,
   where:
      target slope+pi>phase difference−n*pi>target slope−pi; and
   adding m*pi to the phase difference when the difference between the phase difference and the target slope is less than −pi,
   where:
      target slope+pi>phase difference+m pi>target slope−pi.

7. The method of claim 1, wherein the first and second audio signals are frequency domain representations of a frame of audio received at the corresponding microphone over a time interval, and wherein the method is repeated for subsequent frames of audio.

8. The method of claim 7, wherein processing the first and second audio signals comprises:
   determining if the direction error is less than an on-axis threshold, indicating that the frame of audio represented by the first and second audio signals corresponds to voice audio originating from the region of interest; and
   combining the first and second audio signals to enhance the frame of audio when the direction error is less than the on-axis threshold.

9. The method of claim 7, wherein processing the first and second audio signals comprises:
  determining if the direction error is greater than an off-axis threshold, indicating that the frame of audio represented by the first and second audio signals corresponds to noise audio or to voice audio originating from outside the region of interest; and
  combining the first and second audio signals to suppress the frame of audio when the direction error is greater than the off-axis threshold.

10. The method of claim 7, wherein processing the first and second audio signals comprises:
  determining if the direction error is between an off-axis threshold and an on-axis threshold, indicating that the frame of audio represented by the first and second audio signals corresponds to a combination of voice audio originating from the region of interest and noise audio or to voice audio originating from outside the region of interest;
  calculating a mixing mask as a function of frequency; and
  combining the first and second audio signals using the mixing mask when the direction error is between than the off-axis threshold and the on-axis threshold.

11. An apparatus for performing off-axis audio suppression in an audio environment comprising:
  a processor and memory configuring the apparatus to provide:
    a target slope stored in memory defining a desired phase difference between signals from first and second microphones corresponding to audio originating from a region of interest;
    a target adaptation component adjusting the target slope based on the calculated phase difference between the first and second audio signals to adapt the region of interest based on a location of a human speaker within the audio environment;
    a source-locating component calculating a direction error between the target slope and a phase difference between first and second audio signals received from the first and second microphones; and
    an audio mixer processing the first and second audio signals based on the calculated direction error to suppress off-axis audio relative to the positions of the first and second microphones and the region of interest;
  wherein the target adaptation component unwraps the calculated phase difference, calculates a slope of the unwrapped phase difference, calculates a difference between the slope and the target slope, determines if the calculated difference is larger than a defined tolerance, and adjusts the target slope based on the slope of the unwrapped phase difference.

12. The apparatus of claim 11, further comprising:
  calculating a slope confidence value when unwrapping the calculated phase difference, the slope confidence value determined as a sum of a signal-to-noise ratio of each of a plurality of frequency ranges in the calculated phase difference; and
  adjusting the target slope based on the slope of the unwrapped phase difference and the slope confidence value.

13. The apparatus of claim 11, wherein the target adaptation component further sets an initial value for the target slope by:
  smoothing the calculated slope;
  determining if an initial value for the target slope has been set;
  determining if the smoothed slope has been stable for a time interval;
  determining if the smoothed slope is in a desired direction based on the sign of the smoothed slope and the location of the human speaker in the audio environment;
  determining if the first and second audio signals correspond to voice audio; and
  setting the initial value for the target slope based on the smoothed slope when the initial value has not been set, the smoothed slope has been stable for the time interval, the smoothed slope is in the desired direction and the first and second audio signals correspond to voice audio.

14. The apparatus of claim 11, wherein the target adaptation component adjusts the target slope by:
  smoothing the calculated slope;
  determining if the smoothed slope has been stable for a time interval;
  determining if the smoothed slope is in a desired direction based on the sign of the smoothed slope and the location of the human speaker in the audio environment;
  determining if the first and second audio signals correspond to voice audio;
  adjusting the target slope based on the slope of the unwrapped phase difference using a leaky integrator when the smoothed slope has been stable for the time interval, the smoothed slope is in the desired direction and the first and second audio signals correspond to voice audio; and
  keeping the target slope unchanged when the smoothed slope has not been stable for the time interval or the smoothed slope is not in the desired direction or the first and second audio signals do not correspond to voice audio.

15. The apparatus of claim 11, wherein unwrapping comprises:
  calculating a moving average of the phase difference;
  locating zero-crossings of the moving average;
  confirming the zero crossing actually represent direction changes; and
  unwrapping the phase difference based on the located confirmed zero-crossings and a direction of the low-frequency phase difference.

16. The apparatus of claim 11, wherein unwrapping comprises:
  determining if a difference between the phase difference and the target slope is greater than pi or less than −pi;
  subtracting n*pi from the phase difference when the difference between the phase difference and the target slope is greater than pi,
    where:
      target slope+pi>phase difference−n*pi>target slope−pi; and
  adding m*pi to the phase difference when the difference between the phase difference and the target slope is less than −pi,
    where:
      target slope+pi>phase difference+m*pi>target slope−pi.

17. The apparatus of claim 11, further comprising a signal processing component to convert the first and second audio signals to frequency domain representations of a frame of audio received at the corresponding microphone over a time interval.

18. The apparatus of claim 17, wherein the audio mixer determines if the direction error is less than an on-axis threshold, indicating that the frame of audio represented by the first and second audio signals corresponds to voice audio originating from the region of interest and combines the first and second audio signals to enhance the frame of audio when the direction error is less than the on-axis threshold.

19. The apparatus of claim 17, wherein the audio mixer determines if the direction error is greater than an off-axis threshold, indicating that the frame of audio represented by the first and second audio signals corresponds to noise audio or to voice audio originating from outside the region of interest and combines the first and second audio signals to suppress the frame of audio when the direction error is greater than the off-axis threshold.

20. The apparatus of claim 17, wherein the audio mixer determines if the direction error is between an off-axis threshold and an on-axis threshold, indicating that the frame of audio represented by the first and second audio signals corresponds to a combination of voice audio originating from the region of interest and noise audio or to voice audio originating from outside the region of interest and combines the first and second audio signals using a mixing mask calculated as a function of frequency when the direction error is between the off-axis threshold and the on-axis threshold.

21. A computer readable non-transitory memory containing instructions which when executed by a processor perform a method of off-axis audio suppression in an audio environment comprising:

receiving first and second audio signals from first and second microphones positioned within the audio environment;

calculating a phase difference between the first and second audio signals;

adjusting a target slope based on the calculated phase difference between the first and second audio signals to adapt the region of interest based on a location of a human speaker within the audio environment, the target slope defining a desired phase difference between signals from the first and second microphones corresponding to audio originating from a region of interest, and where adjusting the target slope includes:

unwrapping the calculated phase difference;

calculating a slope of the unwrapped phase difference;

calculating a difference between the slope and the target slope;

determining if the calculated difference is larger than a defined tolerance;

adjusting the target slope based on the unwrapped phase difference;

calculating a direction error between the calculated phase difference and a the target slope; and processing the first and second audio signals based on the calculated direction error to suppress off-axis audio relative to the positions of the first and second microphones and the region of interest.

* * * * *